United States Patent
Chuang et al.

(10) Patent No.: US 6,225,429 B1
(45) Date of Patent: May 1, 2001

(54) PROCESS FOR MAKING VINYL CAPROLACTAM-BASED POLYMERS

(75) Inventors: Jui-Chang Chuang, Wayne; Michael A. Drzewinski, Long Valley, both of NJ (US)

(73) Assignee: ISP Investments Inc., Wilmington, DE (US)

( * ) Notice: Subject to any disclaimer, the term of this patent is extended or adjusted under 35 U.S.C. 154(b) by 0 days.

(21) Appl. No.: 09/346,213

(22) Filed: Jul. 1, 1999

(51) Int. Cl.⁷ .............................. C08J 26/08; C08J 20/54
(52) U.S. Cl. ..................... 526/264; 526/258; 526/263; 526/271; 526/303.1; 526/318.3; 526/320; 526/328.5; 526/332
(58) Field of Search ..................... 526/264, 263, 526/271, 303.1, 318.3, 320, 328.5, 332, 258

(56) References Cited

U.S. PATENT DOCUMENTS

| | | | |
|---|---|---|---|
| 4,521,404 | * 6/1985 | Lorenz et al. | 424/71 |
| 5,194,546 | * 3/1993 | Login et al. | 526/263 |
| 5,221,531 | * 6/1993 | Kopolow et al. | 424/71 |
| 5,225,524 | * 7/1993 | Plochocka et al. | 528/482 |
| 5,506,318 | * 4/1996 | Wetzel et al. | 526/219.6 |
| 5,567,786 | * 10/1996 | Tseng et al. | 526/264 |
| 5,603,919 | * 2/1997 | Chuang et al. | 424/47 |
| 5,626,836 | * 5/1997 | Liu et al. | 424/47 |
| 5,830,964 | * 11/1998 | Liu et al. | 526/264 |

\* cited by examiner

*Primary Examiner*—David W. Wu
*Assistant Examiner*—Tanya Zalukaeva
(74) *Attorney, Agent, or Firm*—Walter Katz; William J. Davis; Marilyn J. Maue

(57) ABSTRACT

A process of making a vinyl caprolactam (VCL)-based polymer which comprises suspension polymerizing the monomers in aqueous medium in the absence of an added protective colloid, wherein polymer formed at an early stage of the polymerization functions as a dispersing agent to maintain polymer particles suspended in water throughout the polymerization.

2 Claims, No Drawings

PROCESS FOR MAKING VINYL CAPROLACTAM-BASED POLYMERS

BACKGROUND OF THE INVENTION

1. Field of the Invention

This invention relates to processes for making vinyl caprolactam (VCL)-based polymers, and, more particularly, to a suspension polymerization process for making such polymers in water without requiring the addition of protective colloids, and which are obtained thereby as substantially odor-free polymers, without residual monomers, and in an environmentally friendly solvent.

2. Description of the Prior Art

J. Kroker et al, in U.S. Pat. No. 5,739,195, described a process for preparing an aqueous solution of 10–60% polyvinyl caprolactam (PVCL) homopolymer at a temperature above its cloud point in the presence of 0.1–20% by weight based upon vinyl caprolactam (VCL) monomer of a water-soluble synthetic polymeric protective colloid. Aqueous polyvinyl caprolactam homopolymer made with a protective colloid present in the starting materials was homogeneous, whereas protective colloid free systems were inhomogeneous, which were not readily dilutable with water except stirring for a prolonged period of time. Addition of an emulsifier to the starting material also formed an appreciable portion of PVCL polymer remained attached to the stirrer element.

Accordingly, it is an object of this invention to provide a process for making VCL-based polymers in water without requiring addition of a water-soluble synthetic protective colloid in the reaction mixture.

Another object herein is to provide a process of making VCL-based copolymers and terpolymers by suspension polymerization in which the monomers are fed into the reaction vessel at a predetermined feeding schedule.

Still another object herein is to provide an aqueous solution of VCL-based polymers which are substantially odor-free, monomer-free and uncontaminated by the presence therein of protective colloids.

A feature of the invention is the provision of an aqueous suspension polymerization process for making VCL-based copolymers or terpolymers wherein a suitable dispersing agent for the copolymer product is generated in-situ during the polymerization.

These and other objects and features of the invention will be made apparent from the following description thereof.

SUMMARY OF THE INVENTION

What is described herein is an aqueous suspension polymerization process for making VCL-based polymers without an added protective colloid, in which the monomers are introduced into the reaction vessel at a predetermined feeding schedule, and wherein the dispersing agent to keep the copolymer product in a stirrable state during the polymerization is generated in situ during the course of the polymerization. In this invention, accordingly, the polymerization process proceeds smoothly to form a uniform suspension of fine polymer particles in water at a temperature above the cloud point of the polymer without developing large lumps of polymer material during polymerization.

The product of this process is an odor-free, monomer-free, aqueous solution of the desired VCL-based polymer uncontaminated by a protective colloid.

The process is adaptable to any VCL-based polymers, which are made by copolymerizing VCL monomer with one or more substantially water-soluble monomers. Examples of representative copolymers, but not limited to, are copolymers of VCL and vinyl pyrrolidone (VP) and copolymers of VCL and acrylamide and its N-substituted derivatives thereof; terpolymers of VCLI P/$M_3$, where $M_3$ is a third monomer such as N,N-dimethylaminoethyl acrylate (DMAEA), N,N-dimethylaminoethyl methacrylate (DMAEMA) and their N-quaternary derivatives thereof; t-butylaminoethyl methacrylate (BAEMA); acrylamide, N,Ndimethylacrylamide (DMAM), N,N-dimethylaminopropyl acrylamide (DMAPAM), N,N-dimethylaminopropyl methacrylamide (DMAPMA) and [3-(methacryloylamino)propyl] trimethylammonium chloride (MAPTAC); diallyidimethylammonium chloride (DADMAC); hydroxyethyl (meth)acrylate and hydroxypropyl (meth)acrylate, in predetermined proportions of each monomers, and mixtures thereof.

The product can be used to provide completely alcohol-free, hair care compositions, e.g., 0% VOC hair fixatives and hair conditioners, gas hydrate inhibitors and ink-jet printing media.

DETAILED DESCRIPTION OF THE INVENTION

The polymerization process of the invention is carried out at a temperature of at least 15° C., preferably 30° C., above the cloud point of the copolymer, as a suspension polymerization. In this protective colloid-free system, the monomers are fed into the reaction vessel at a predetermined feeding schedule to generate the polymer product in-situ at an early stage of the reaction as the dispersing agent to maintain the copolymer particles suspended in water during the polymerization. Accordingly, no added protective colloid is necessary in this process. The polymer product thus is a fine dispersion of polymer particles in water before cooling, without any polymer build-up on the agitator shaft and/or reactor wall, which causes agitation problems and a prolonged period of time to re-dissolve the polymer in water.

In a typical run, about 10–50%, preferably 20–40%, of the total amount of VP, or VP and a substantially water-soluble monomer ($M_3$), with initiator is fed into water at the reaction temperature over 30 minutes, followed by metering in the remaining monomer pre-mix with initiator over 1–2 hours. Alternatively, the initiator can be fed separately into the reaction vessel. After holding the reaction mixture for one hour, 2–4 additional booster shots of initiators are added to react out any residual monomer to the desired low level. At the end of the reaction, the batch is cooled to ambient conditions to form a clear, viscous polymer solution.

As described, the VCL-based copolymers of the present invention, copolymers are made by copolymerizing VCL monomer with one or more substantially water-soluble monomers in predetermined proportions of each monomer. Examples of representative water-soluble comonomers, but not limited to, are vinyl amides such as vinylpyrrolidone and N-vinyl formamide; acrylamide and its N-substituted derivatives thereof such as N,N-dimethylacrylamide (DMAM), N,N-dimethylaminopropyl acrylamide (DMAPAM), N,N-dimethylaminopropyl methacrylamide (DMAPMA) and [3-(methacryloyl-amino)propyl] trimethylammonium chloride (MAPTAC); t-butylaminoethyl methacrylate (BAEMA); N,N-dialkylaminoalkyl (meth)acrylates such as N,N-dimethylaminoethyl acrylate (DMAEA), N,N-dimethylaminoethyl methacrylate (DMAEMA) and their N-quaternary derivatives thereof; diallyldimethylammonium chloride (DADMAC); hydroxyalkyl (meth)acrylates such as hydroxyethyl acrylate, hydroxypropyl acrylate, hydroxyethyl methacrylate and hydroxypropyl methacrylate and mixtures thereof.

Usually the polymerization processes in water is performed at a temperature between 50° to 100° C. under nitrogen atmosphere, although polymerization can also be carried out at a temperature above 100° C. under pressure, or at a temperature below 50° C. using redox initiators. Suitable polymerization initiators typically have a half-life of 1–5 hours at a given polymerization temperature. Representative polymerization initiators include azo compounds such as 2,2'-azobis(2,4-dimethylvaleronitrile) (VAZO-52), 2,2'-azobis(isobutyronitrile) (VAZO-64), 2,2'-azobis (methylbutyronitrile) (VAZO-67) and 1,1'-azobis (cyanocyclohexane) (VAZO-88, du Pont); peroxyesters such as t-butyl peroxypivalate (Lupersol 11M75), t-amyl peroxypivalate (Lupersol 554M75) and t-amyl peroxy-2-ethylhexanote (Lupersol 575, Elf Atochem); peroxydicarbonates such as di-(2-ethylhexyl) peroxydicarbonate (Lupersol 223, Elf Atochem) and di-(4-t-butylcyclohexyl) peroxydicarbonate (Perkadox 16S, Akzo Nobel). During the residual monomer reduction period, a second polymerization initiator, if needed, can be used to speed up the polymerization cycle. The residual monomers can be eliminated by treatment with hydrogen peroxide thereby to minimize odor in the product.

The process of the invention enables the synthesis of VCL-based terpolymers directly in water, such as for example, GAFFIX® VC-713 and Aquaflex® SF40 polymers, which are both currently available from International Specialty Products, Inc. in ethanol. Water is an environmentally friendly solvent and is preferred in many end uses, for example, hair care formulations such as hairsprays, mousses, styling gel, etc., gas hydrate inhibition, ink jet printing, and the like.

The term polymer, copolymer or terpolymer, as used herein, refers to VCL-based polymers with one or more monomers, and allows for copolymers, terpolymers, tetrapolymers, etc. as desired. Suitably such VCL-based polymers should contain at least about 40% VCL, and preferably 50% or more, by weight, in the composition.

The invention will now be described in more detail with reference to the following examples.

EXAMPLE 1

Preparation of Vinyl Caprolactam (VCL) Vinylpyrrolidone (VP) (50/50) Copolymer in Water Without Protective Colloid This example illustrates the preparation of vinyl caprolactam (VCL)/vinylpyrrolidone (VP) (50/50) directly in water, after water according to a predetermined monomer feeding sequence, and without adding a protective colloid.

300.00 g of distilled water was charged into a 1-l resin kettle, fitted with a nitrogen inlet tube, an anchor agitator, a thermal watch/thermocouple probe and a heating mantle. After pH adjustment to 10 with 2 drops of concentrated ammonium hydroxide, nitrogen sparging was started and continued throughout the run. The kettle was then heated to 75° C. and maintained at 75° C. with an agitation speed at 250 rpm. A pre-charge mixture of 5.00 g of distilled vinyl pyrrolidone and 0.20 g of Lupersol 11M75 initiator (t-butyl peroxypivalate, 75% active), corresponding to 5% of total monomers, was pumped into the resin kettle over a period of 30 minutes. Thereafter, a mixture of 50.00 g of vinyl caprolactam (V-CAP/RC®, ISP), 40.00 g of vinyl pyrrolidone and 0.60 g of Lupersol 11M75 initiator was pumped into the resin kettle over the next 60 minutes. The reaction mixture turned milky within 5 minutes upon charging of the monomer pre-mix. Finally, a mixture of 5.00 g of vinyl pyrrolidone and 0.20 g of Lupersol 11M75 initiator was metered into the resin kettle over 30 minutes, followed by holding the reaction mixture at 75° C. for 60 minutes. 0.30 g of Lupersol 11M75 initiator was added and the reaction was held at 75° C. for 3 hours to react out residual monomers. The copolymer product was a milky-white dispersion in water at 75° C. Upon cooling, it gained in viscosity at 50–55° C. and became a substantially clear, viscous solution at room temperature. The solids content was adjusted to 25% in water. Gas chromatography (GC) analysis indicated that no residual VP or VCL monomer was present. The polymer had a cloud point of 55° C. (0.5% in water) and a relative viscosity of 2.027 (1% in water).

EXAMPLE 2

Preparation of Vinyl Caprolactam (VCL) Vinylpyrrolidone (VP)/Dimethylaminoethyl Methacrylate (DMAEMA) (71/24/5) Copolymer in Water Without Protective Colloid This example illustrates the preparation of a vinyl caprolactam-based hair fixative polymer, namely VCL/VP/DMAEMA (71/24/5) copolymer, directly in water according to a predetermined monomer feeding sequence, and without adding a protective colloid. It further describes the use of hydrogen peroxide as the chase initiator, which generates water as the sole by-product, to minimize offensive odor due to the use of excessive amounts of organic initiator.

300.00 g of distilled water was charged into a 1-l resin kettle, fitted with a nitrogen inlet tube, an anchor agitator, a thermal watch/thermocouple probe and a heating mantle. After pH adjustment to 10 with 2 drops of concentrated ammonium hydroxide, nitrogen sparging was started and continued throughout the run. The kettle was then heated to 80° C. and maintained 80° C. with an agitation speed at 250 rpm. A pre-charge mixture of 4.80 g of distilled VP, 1.00 g of DMAEMA and 0.20 g of Lupersol 11M75 initiator (t-butyl peroxypivalate, 75% active), corresponding to 5.8% of total monomers, was pumped it into the resin kettle over a period of 30 minutes. Thereafter, a mixture of 71.00 g of VCL (V-CAP/RC®, ISP), 19.20 9 of VP, 4.00 g of DMAEMA and 0.80 g of Lupersol 11M75 initiator was pumped into the resin kettle over the next 60 minutes. The reaction mixture turned milky within 5 minutes upon the charging of the monomer pre-mix. After completion of monomer feeding, the reaction mixture was held at 80° C. for 60 minutes. Residual monomers were reduced by treatment with 2.00 g of hydrogen peroxide (30% active) every 90 minutes for three times. The copolymer product was a milky-white dispersion in water at 80° C. Upon cooling, the reaction product gained in viscosity at about 50° C. and became a clear, viscous solution at room temperature. The solids content was adjusted to 25 % in water. Gas chromatography (GC) analysis indicated that it contained only 0.0080% VCL, 0.0021% VP and ≦0.010% DMAEMA. The polymer had a cloud point of 45° C. (0.5% in water) and a relative viscosity of 1.765 (1% in water).

EXAMPLES 3–7

Preparation of Vinyl Caprolactam (VCL) Vinylpyrrolidone (VP)/Dimetylaminoethyl Methacrylate (DMAEMA) Copolymers in Water Without Protective Colloid The following examples illustrate the preparation of VCL/VP/DMAEMA copolymers of different compositions directly in water according to a predetermined monomer feeding sequence, without adding a protective colloid. Examples 3–5 described the use of mixed initiator systems containing a peroxyester initiator and a hydrogen peroxide chase initiator, aiming at minimizing offensive odor due to the use of excessive amounts of organic initiator. Examples 6–7 described the use of hydrogen peroxide as the sole initiator to prepare the desired low molecular weight polymers.

The results are shown in Table 1 below.

TABLE 1*

| Example | Monomer Ratio | Wt % VP/DMAEMA in Pre-charge Step | Initiator Chaser | Reaction Temperature | Reaction Time, Hour | Cloud Point | Relative Viscosity |
|---|---|---|---|---|---|---|---|
| 3 | 71/24/5 | 5.8 | Lupersol 575/ $H_2O_2$ | 95° C./95° C. | 2.5/10 | 42° C. | 1.863 |
| 4 | 65/30/5 | 7.0 | Lupersol 11/ $H_2O_2$ | 80° C./80° C. | 2.5/12 | 42° C. | 1.920 |
| 5 | 80/15/5 | 6.0 | Lupersol 11/ $H_2O_2$ | 75° C./80° C. | 3.8 | 37° C. | 2.152 |
| 6 | 71/24/5 | 5.8 | $H_2O_2/H_2O_2$ | 70° C./70° C. | 3/6 | 52° C. | 1.110 |
| 7 | 80/15/5 | 3.0 | $H_2O_2/H_2O_2$ | 80° C./80° C. | 3/6 | 61° C. | 1.039 |

*The peroxyester initiators listed above are Lupersol 11 (t-butyl peroxypivalate, 75% active) and Lupersol 575 (t-amyl peroxy-2-ethylhexanote, 95% active). Cloud point and relative viscosity values were determined as described in Example 1.
Reaction time refers to 0.5 hour for monomer precharge, 1.0 or 1.5 hours for charging monomer premix and 1.0 hour holding at the reaction temperature before residual monomer reduction step.

EXAMPLE 8

Preparation of Vinyl Caprolactam (VCL) Vinylpyrrolidone (VP)/N-[3-(Dimethylamino) propyl] Methacrylamide (DMAPMA) (86/8/6) Copovymer in Water Without Protective Colloid This example illustrates the preparation of a vinyl caprolactam-based fixative polymer, namely VCL/VP/DMAPMA (86/18/16) copolymer, directly in water, according to a predetermined monomer feeding sequence, and without adding a protective colloid. It further describes the use of hydrogen peroxide as the chase initiator, which generates water as the sole by-product, to minimize offensive odor due to the use of excessive amounts of organic initiator.

300.00 g of distilled water was charged into a one-liter resin kettle, fitted with a nitrogen inlet tube, an anchor agitator, a thermal watch/thermocouple probe and a heating mantle. After pH adjustment to 10 with 2 drops of concentrated ammonium hydroxide, nitrogen sparging was started and continued throughout the experiment. The kettle was then heated to 80° C. and maintained 80° C. throughout while keeping the agitation speed at 250 rpm. A pre-charge mixture of 4.00 g of distilled VP, 2.00 g of DMAPMA and 0.20 g of Lupersol 11M75 initiator (t-butyl peroxypivalate, 75% active), corresponding to 6.0% of total monomers, was pumped into the resin kettle over a period of 30 minutes. Thereafter, a mixture of 86.00 g of VCL (V-CAP/RC®, ISP), 4.00 g of VP, 4.00 g of DMAPMA and 0.80 g of Lupersol 11M75 initiator was pumped in over 60 minutes. The reaction mixture turned milky within 5 minutes upon the charging of monomer pre-mix. After the completion of monomer feeding, the reaction mixture was held at 80° C. for 60 minutes. Residual monomers were chased by adding 2.00 g of hydrogen peroxide (30% active) every 90 minutes for four times to react out unreacted monomers. The copolymer thus obtained was a milky-white dispersion in water at 80° C. Upon cooling, the reaction product gained viscosity at about 50° C. and became a nearly clear, viscous solution at room temperature. The solids content was adjusted to 25% in water. Gas chromatography (GC) analysis indicated that it contained only 0.0080% VCL, 0.0100% VP and ≦0.010% DMAPMA. The polymer has a cloud point of 45° C. (0.5% in water) and a relative viscosity of 2.324 (1% in water).

EXAMPLES 9–11

Preparation of Similar Vinyl Caprolactam (VCL)/ Vinylpyrrolidone (YP)IN-[3-(Dimethylamino) Propyl] Methacrylamide (DMAPMA) Copolymers in Water Examples 9–11 illustrates the preparation of VCL/VP/DMAPMA copolymers of different compositions, directly in water, according to a predetermined monomer feeding sequence, and without adding a protective colloid. Each polymer was made with a mixed initiator system containing a peroxyester initiator (Lupersol 11) and hydrogen peroxide chase initiator, aiming at minimizing offensive odor due to the use of excessive amounts of initiator.

TABLE 2*

| Example | Monomer Ratio | Wt % VP/DMAPMA in Precharge Step | Initiator Chaser | Reaction Temperature | Reaction Time, Hour | Cloud Point | Relative Viscosity |
|---|---|---|---|---|---|---|---|
| 9 | 70/20/10 | 9.0 | Lupersol 575/ $H_2O_2$ | 90° C./90° C. | 3.5/6 | 49° C. | 1.798 |
| 10 | 75/20/5 | 5.0 | Lupersol 11/ $H_2O_2$ | 80° C./80° C. | 2.5/8 | 44° C. | 2.558 |
| 11 | 80/15/5 | 4.0 | Lupersol 11/ $H_2O_2$ | 80° C./80° C. | 2.5/8 | 42° C. | 2.545 |

*The peroxyester listed above is Lupersol 11 (t-butyl peroxypivalate, 75% active). Cloud point and relative viscosity were determined as in Example 1.
Reaction time refers to 0.5 hour for monomer precharge, 1.0 or 2.0 hours for charging monomer pre-mix and 1.0 hour holding at the reaction temperature before residual monomer reduction step.

EXAMPLE 12

Preparation of Vinyl Caprolactam (VCL) Vinylpyrrolidone (VP)/[N-(Methacryloylamino)proyl] Trimethylammonium Chloride (MAPTAC) (50/40/10) Copolymer in Water Without Protective Colloid This example illustrates the preparation of a vinyl caprolactam-based hair conditioning polymer, namely VCL/VP/MAPTAC (50/40/10) copolymer, directly in water according to a predetermined monomer feeding sequence, and without adding a protective colloid. The process uses hydrogen peroxide as the chase initiator, which generates water as the sole by-product, to minimize offensive odor causing by the use of excessive amounts of peroxyester initiator.

290.00 g of distilled water was charged into a one-liter resin kettle, fitted with a nitrogen inlet tube, an anchor agitator, a thermal watch/thermocouple probe and a heating mantle. After pH adjustment to 10 with 2 drops of concentrated ammonium hydroxide, nitrogen sparging was started and continued throughout the run. The kettle was then heated to 80° C. and maintained 80° C. throughout the experiment while keeping agitation speed at 250 rpm. A precharge mixture of 8.00 g of distilled VP, 4.00 g of MAPTAC (50% active in water) and 0.20 g of Lupersol 11M75 initiator (t-butyl peroxypivalate, 75% active), corresponding to 10.0% of total monomers, was prepared and pumped it into the resin kettle over a period of 30 minutes. Thereafter, a mixture of 50.00 g of VCL (V-CAP/RC®, ISP), 32.00 g of VP, 16.00 g of MAPTAC (50% active) and 0.80 g of Lupersol 11M75 initiator was prepared and then pump into the resin kettle over the next 60 minutes. The reaction mixture turned milky within 5 minutes upon the charging of monomer premix. After the completion of monomer feeding, the reaction mixture was held at 80° C. for 60 minutes. Residual monomers were chased by adding 2.00 g of hydrogen peroxide (30% active) every 90 minutes for four times to react out unreacted monomers. The copolymer thus obtained was a milky-white dispersion in water at 80° C. Upon cooling, the reaction product gained viscosity at about 50° C. and became a nearly clear, viscous solution at room temperature. The solids content was adjusted to 25% in water. Gas chromatography (GC) analysis indicated that residual VCL content was 0.0096% and residual VP level was undetectable. The polymer has a cloud point of 58° C. (0.5% in water) and a relative viscosity of 1.828 (1% in 0.4 N LiNO$_3$ aqueous solution).

EXAMPLE 13

Preparation of Vinyl Caprolactam (VCL)/ Vinylpyrrolidone (VP)/2-Hydroxyethyl Methacrylate (HEMAN (50/30/20) Copolymer in Water Without Protective Colloid This example illustrates the preparation of a vinyl caprolactam-based hair fixative polymer, namely VCL/VP/ HEMA (50/30/20) copolymer, directly in water, according to a predetermined monomer feeding sequence, and without adding a protective colloid. The process uses hydrogen peroxide as the chase initiator, which generates water as the sole by-product, to minimize offensive odor causing by the use of excessive amounts of peroxyester initiator.

200.00 g of distilled water was charged into a one-liter resin kettle, fitted with a nitrogen inlet tube, an anchor agitator, a thermal watch/thermocouple probe and a heating mantle. After pH adjustment to 10 with 2 drops of concentrated ammonium hydroxide, nitrogen sparging was started and continued throughout the experiment. The kettle was then heated to 80° C. and maintained 80° C. throughout the experiment while keeping agitation speed at 250 rpm. A pre-charge mixture of 6.00 g of distilled VP and 0.20 g of Lupersol 11M75 initiator (t-butyl peroxypivalate, 75% active), corresponding to 6.0% of total monomers, was prepared and pumped it into the resin kettle over a period of 30 minutes. Thereafter, a mixture of 50.00 g of VCL (V-CAP/RC®, ISP), 24.00 g of VP, 20.00 g of HEMA and 0.80 g of Lupersol 11M75 initiator was prepared and then pump into the resin kettle over the next 60 minutes. The reaction mixture turned milky within 5 minutes upon the charging of monomer pre-mix. After the completion of monomer feeding, the reaction mixture was held at 80° C. for 60 minutes. Residual monomers were chased by adding 1.20 g of hydrogen peroxide (50% active) every 90 minutes for six times to react out un-reacted monomers. The copolymer thus obtained was a milky-white dispersion in water at 80° C. Upon cooling, the reaction product gained viscosity at about 50° C. and became a nearly clear, viscous solution at room temperature. The solids content was adjusted to 33% in water. Gas chromatography (GC) analysis indicated that it contained 0.0035% VCL and 0.0057% VP. The polymer has a cloud point of 38° C. (0.5% in water) and a relative viscosity of 1.478 (1% in water).

EXAMPLE 14

Preparation of Vinyl Caprolactam CVCL) Vinylpyrrolidone (VP)/Sodium 2-Acrylamido-2-Methyl-1- Propanesulfonate (NaAMPS) (50/40/10) Copolymer in Water Without Protective Colloid This example illustrates the preparation of a vinyl caprolactam-based hair fixative polymer, namely VCL/VP/ NaAMPS (50/40/10) copolymer, directly in water, according to a predetermined monomer feeding sequence, and without adding a protective colloid. It further describes the use of hydrogen peroxide as the chase initiator, which generates water as the sole by-product, to minimize offensive odor due to the use of excessive amounts of organic initiator.

290.00 g of distilled water was charged into a one-liter resin kettle, fitted with a nitrogen inlet tube, an anchor agitator, a thermal watch/thermocouple probe and a heating mantle. After pH adjustment to 10 with 2 drops of concentrated ammonium hydroxide, nitrogen sparging was started and continued throughout the experiment. The kettle was then heated to 90° C. and maintained 90° C. throughout the experiment while keeping agitation speed at 250 rpm. A precharge mixture of 8.00 g of distilled VP, 4.00 g of NaAMPS (50% in water) and 0.20 g of Lupersol 575 initiator (t-amyl peroxy-2-ethylhexanoate, 95% active), corresponding to 10.0% of total monomers, was prepared and pumped it into the resin kettle over a period of 30 minutes. Thereafter, a mixture of 50.00 g of VCL (V-CAP/RC®, ISP), 32.00 g of VP, 16.00 g of NaAMPS (50% active) and 0.80 g of Lupersol 575 initiator was prepared and then pump into the resin kettle over the next 60 minutes. The reaction mixture turned milky within 5 minutes upon the charging of monomer pre-mix. After the completion of monomer feeding, the reaction mixture was held at 80° C. for 60 minutes. Residual monomers were chased by adding 1.20 g of hydrogen peroxide (50% active) every 90 minutes for six times to react out un-reacted monomers. The copolymer thus obtained was a milky-white dispersion in water at 90° C. Upon cooling, the reaction product gained viscosity at about 50° C. and became a nearly clear, viscous solution at room temperature. The solids content was adjusted to 25 % in water. Gas chromatography (GC) analysis indicated that residual VCL was 0.0041% and residual VP level was un-detectable. The polymer has a cloud point of 56° C. (0.5% in water) and a relative viscosity of 2.124 (1% in 0.4 N LiNO$_3$ aqueous solution).

COMPARATIVE EXAMPLE 1

Preparation of VCL/VP/DMAEMA (71/24/5) Copolymer in Water Without Protective Colloid by Feeding Monomer Mixture at a Constant Rate This example describes the failure of attempting to prepare a vinyl caprolactam-based hair fixative polymer, namely VCL/VP/DMAEMA (71/24/5) copolymer, directly in water by feeding a pre-mix of all three monomers in the presence of a initiator at constant rate without adding a protective colloid. The polymerization process proceeded with great difficulty to maintain agitation and terminated eventually, due to the formation of lumps of polymer.

300.00 g of distilled water was charged into a one-liter resin kettle, fitted with a nitrogen inlet tube, an anchor agitator, a thermal watch/thermocouple probe and a heating mantle. After pH adjustment to 10 with 2 drops of concentrated ammonium hydroxide, nitrogen sparging was started and continued throughout the experiment. The kettle was then heated to 65° C. and the agitation speed was kept at 250 rpm. A mixture of 71.00 g of VCL (V-CAP/RC®, ISP), 24.00 g of distilled VP, 5.00 g of DMAEMA and 1.00 g of Lupersol 11M75 initiator (t-butyl peroxypivalate, 75% active) was prepared and pumped it into the resin kettle over a period of 2 hours. The reaction mixture turned milky within 10 minutes upon the charging of monomer premix. The reaction mixture became viscous during the course of monomer feeding and eventually formed lumps adhered to the agitator shaft, causing difficulties to maintain constant agitation speed. Upon the completion of monomer feed, the reaction mixture was cooled to 45–50° C. to dissolve lumps. When the batch was heated to polymerization temperature of 80° C., the polymer formed lumps again instead of a low viscosity, polymer dispersion in water of this invention as illustrated in Example 2. The reaction was terminated by cooling it to ambient temperature and the reaction mixture was discarded.

COMPARATIVE EXAMPLE 2

Preparation of VCL/VP/DMAPMA (86/8/6) Copolymer in Water Without Protective Colloid by Feeding Monomer Mixture at a Constant Rate This example describes the failure of attempting to prepare a vinyl caprolactam-based hair fixative polymer, namely VCL/VP/DMAPMA (86/8/6) copolymer, directly in water by feeding a pre-mix of all three monomers in the presence of a initiator at constant rate without adding a protective colloid. The polymerization process proceeded with difficulties to maintain agitation and terminated eventually, due to the formation lumps of polymer on agitation shaft and reactor wall.

300.00 g of distilled water was charged into a one-liter resin kettle, fitted with a nitrogen inlet tube, an anchor agitator, a thermal watch/thermocouple probe and a heating mantle. After pH adjustment to 10 with 2 drops of concentrated ammonium hydroxide, nitrogen sparging was started and continued throughout the experiment. The kettle was then heated to 80° C. and maintained 80° C. throughout the experiment while keeping agitation speed at 250 rpm. A mixture of 86.00 g of VCL (V-CAP/RC®, ISP), 8.00 g of distilled VP, 6.00 g of DMAPMA and 1.00 g of Lupersol 11M75 initiator (t-butyl peroxypivalate, 75% active) was prepared and pumped it into the resin kettle over a period of 2 hours. The reaction mixture turned milky within 5 minutes upon the charging of monomer pre-mix. After the completion of monomer feeding, the reaction mixture was held at 80° C. for 60 minutes. During this period, portions of the polymer formed lumps and started to accumulate on the agitator shaft and reactor wall. Residual monomers were chased by adding 1.00 g of hydrogen peroxide (50% active) every 90 minutes for four times to react out unreacted monomers. The copolymer thus obtained was a milky-white dispersion in water with a thick layer of polymer adhered to the reactor wall at 80° C., compared to a low-viscosity, polymer dispersion in water of this invention as illustrated in Example 9. The dispersed reaction product gained viscosity upon cooling to about 50° C. and formed a slightly milky, two-layer viscous solution at room temperature. The polymer adhered to the reactor was not soluble in water after agitation for 4 hours. Gas chromatography (GC) analysis indicated that it contained 1.59% VCL and 0.25% VP.

While the invention has been described with particular reference to certain embodiments thereof, it will be understood that changes and modifications may be made which are within the skill of the art. Accordingly, it is intended to be bound only by the following claims.

What is claimed is:

1. A process of making a vinyl caprolactam (VCL)-based terpolymer by suspension polymerization of the monomers in water in the absence of an added protective colloid, said terpolymer contains about 50–86% by wt. VCL, and the rest is vinyl pyrrolidone (VP) monomer and an $M_3$ monomer, where $M_3$ is selected from the group consisting of N,N-dimethylanminopropyl methacrylamide (DMAPMA) N,N-dimethylaminoethyl methacrylate, quaternary derivatives thereof, and mixtures thereof; at a polymerization temperature which is at least 35° C. higher than the cloud point of 45° C. of said terpolymer, by the steps of: (a) feeding over time a monomer pre-mix comprising VP and $M_3$, and initiator, into a reaction vessel containing water as solvent heated to said polymerization temperature, thereby to generate in situ copolymer particles, which function as a dispersing agent for said terpolymer during, the polymerization, (b) thereafter feeding the VCL monomer, and the rest of the VP and $M_3$ monomers and initiation into said vessel, over a predetermined period, and (c) polymerizing said monomers with said dispersing copolymer therein to provide, upon cooling to room temperature, a clear, viscous aqueous terpolymer solution.

2. A suspension polymerization process according to claim 1, wherein the first monomer feed comprises a premix of VP and $M_3$ which corresponds to about 10 to 50% of their weight in the terpolymer composition.

* * * * *